Sept. 20, 1927.
L. D. STRIPLING
TRACTOR
Filed Dec. 4, 1925

Inventor
L. D. Stripling

Sept. 20, 1927.  
L. D. STRIPLING  
TRACTOR  
Filed Dec. 4, 1925

Inventor  
L. D. Stripling  
By  
Attorney

Patented Sept. 20, 1927.

1,643,098

UNITED STATES PATENT OFFICE.

LESLIE D. STRIPLING, OF BIG SPRING, TEXAS.

TRACTOR.

Application filed December 4, 1925. Serial No. 73,266.

This invention relates to new and useful improvements in tractors, and particularly to steering mechanisms therefor.

One object of the invention is to provide a mechanism whereby a tractor may be steered within a short space, thus obviating the use of the usual steering knuckles of the front axle.

Another object is to provide means whereby one or the other of the rear wheels of the tractor may be held against rotating, while the other wheel continues to drive, as in making a short turn.

Other objects and advantages will be apparent from the following description when taken in connection with the accompanying drawings.

In the drawings:

Figure 4 is a sectional detail view through one of the brake drums.

Figure 1:
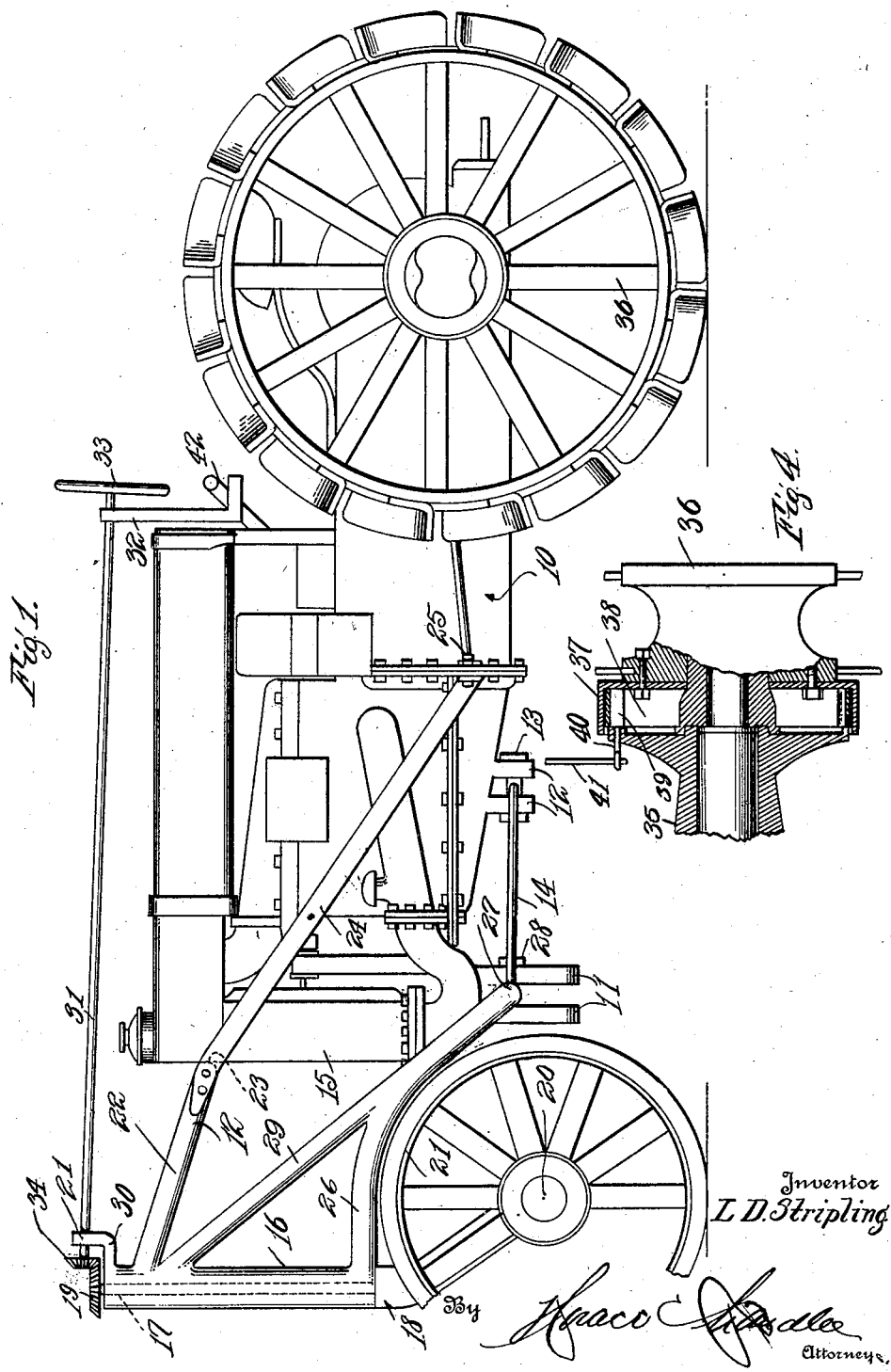
Figure 1 is a side elevation of a tractor with the present invention applied thereto.
Figure 2:
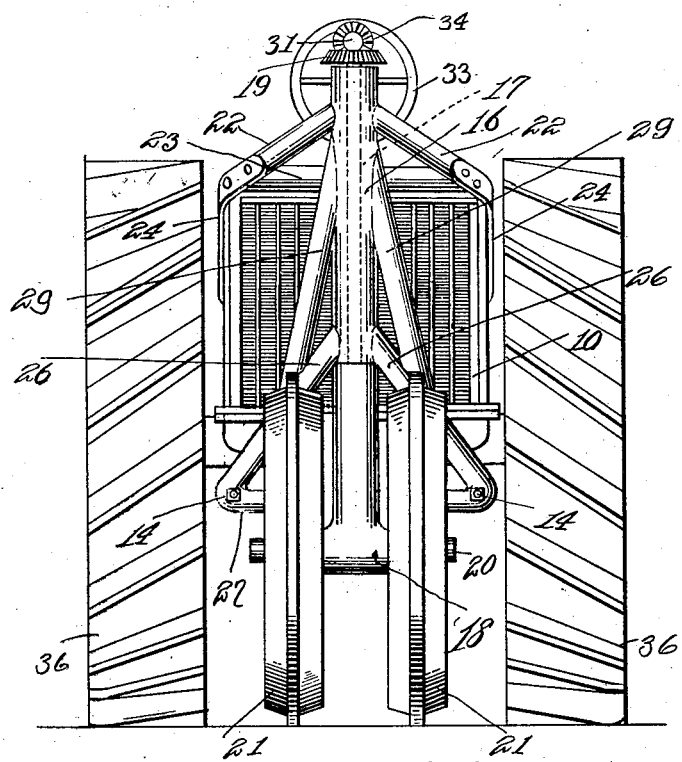
Figure 2 is a front elevation of the same.

Referring particularly to the accompanying drawings, 10 represents the tractor, which has the front axle lugs 11, and the spaced lugs 12, on the lower portion thereof. Extending forwardly and rearwardly of the tractor, and rockably supported in the lugs 12, is a pin 13, through which is disposed the bight portion of the V-shaped brace 14. The forward ends of this brace ordinarily are disposed through the front axle of the tractor, but in view of the fact that the front axle is removed, these lugs are used for another purpose which will presently appear herein.

Disposed vertically in front of the radiator 15, of the tractor, is a post 16, and extending vertically through this post is the steering post or shaft 17, the lower end of which is provided with the fork 18, while the upper end is provided with the bevel gear 19. A transverse shaft 20 is disposed through the fork or head 18, and mounted on the ends of the shaft are the front ground wheels 21, said wheels being of the same size as those used on the front axle of the tractor. Extending rearwardly, and slightly downwardly from the upper portion of the hollow post 16 are the brace arms 22, the rear ends of which are connected by a bight portion 23, which rests against the upper portion of the radiator 15. From each of the brace arms 22 there extends a brace rod 24, the rear end of which is properly engaged with a bolt 25, of the frame of the tractor, as clearly seen in Figure 1. Extending rearwardly and downwardly from the lower end of the post 16 are the brace arms 26, the lower rear ends of which are connected by the bight portion 27 which is disposed transversely of the tractor, and between the lugs 11, and receives therethrough the usual pivot pin 28. Inclined braces extend from the upper portion of the post 16, as shown at 29, and are connected with the braces 26, at the lower ends thereof. The forward ends of the arms of the V-shaped brace 14 are connected with the lower ends of the brace arms 26, whereby to provide a rigid structure.

On the upper end of the post 16 there is formed the L-shaped bearing bracket 30, through which is disposed the forward end of the steering shaft 31, the rear end of said shaft being supported in the bracket 32, on the rear of the tractor, and provided with the hand wheel 33. By rotating this hand wheel 33 the shaft 17 will be rotated, and the front wheels properly steered, and by reason of the fact that said wheels are in close proximity to each other, a short turn can be made. The forward end of the shaft 31 is provided with a bevel gear 34 meshing with the gear 19.

Figure 3:
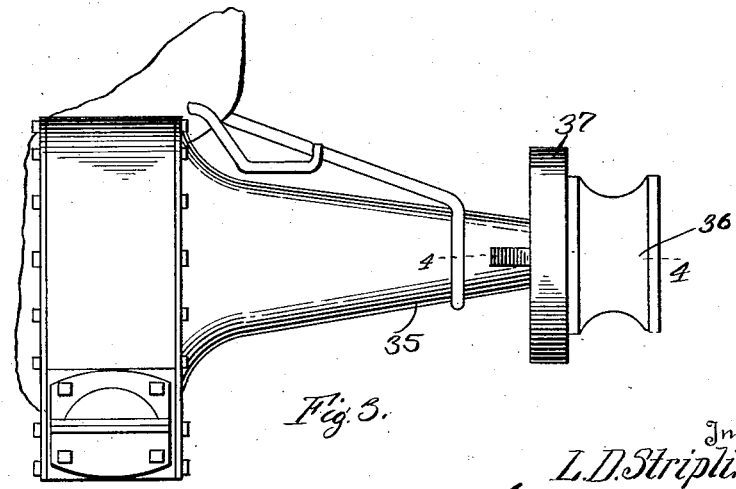
Figure 3 is an elevation of a portion of the rear end of the tractor.

The rear axle housings 35, as well as the rear axle sections therewithin, are of slightly greater length than those of the ordinary tractor, the traction wheels 36 being mounted on the ends of said axle sections, as shown in the drawings, and particularly in Figure 3. Secured to each wheel 36 is a brake 37, and within the drum is disposed the expanding brake band 38, the ends of the band being adapted to be spread by the cam member 39, disposed therebetween. This cam member 39 is provided with a terminal crank arm 40, which is connected with a rod or link 41, said link being connected with the hand lever 42 in any suitable manner.

When the tractor is to be steered within a small space, the operator rotates the steering wheel 33 with one hand to turn the front wheels, and at the same time operates the proper lever 42, with the other hand, to apply the brake to the wheel at the side of the tractor toward which the turn is being made. Thus the inside wheel will be held against driving action, while the outside wheel will have full driving action, whereby the tractor may be turned in a small space.

What is claimed is:

An extension frame for the front wheels of a tractor comprising a vertical post, a rearwardly extending triangular member carried by the upper portion of the post and arranged to engage its base against the radiator of a tractor, a second triangular frame extending rearwardly and downwardly from the post and having its base adapted to engage between the front axle lugs of a tractor, the ends of the base of the last-named triangular frame being apertured for reception of the ends of the usual V-shaped brace of a tractor, curved braces extending between the post and the second triangular frame, and brace arms carried by the first triangular frame and extending downwardly and rearwardly for attachment to a part of a tractor.

In testimony whereof, I affix my signature.

LESLIE D. STRIPLING.